(12) United States Patent
Soler et al.

(10) Patent No.: US 11,415,113 B2
(45) Date of Patent: Aug. 16, 2022

(54) WIND TURBINE HUBS

(71) Applicant: General Electric Company, Schenectady, NY (US)

(72) Inventors: Xavier Soler, Barcelona (ES); Xavier Santamaria, Barcelona (ES); Samuel Segura, Barcelona (ES)

(73) Assignee: General Electric Company, Schenectady, NY (US)

(*) Notice: Subject to any disclaimer, the term of this patent is extended or adjusted under 35 U.S.C. 154(b) by 276 days.

(21) Appl. No.: 15/964,874

(22) Filed: Apr. 27, 2018

(65) Prior Publication Data

US 2018/0313338 A1 Nov. 1, 2018

(51) Int. Cl.
*F03D 80/70* (2016.01)
*F03D 1/06* (2006.01)

(52) U.S. Cl.
CPC ........... *F03D 80/70* (2016.05); *F03D 1/0691* (2013.01); *F05B 2230/60* (2013.01); *F05B 2240/21* (2013.01); *F05B 2240/50* (2013.01); *Y02E 10/72* (2013.01)

(58) Field of Classification Search
CPC .... F03D 1/0691; F03D 80/70; F05B 2240/50; F05B 2240/21; F05B 2230/60; F16C 35/077
See application file for complete search history.

(56) References Cited

U.S. PATENT DOCUMENTS

| | | | | |
|---|---|---|---|---|
| 7,084,522 | B2* | 8/2006 | Wobben | F03D 1/065 290/55 |
| 9,284,949 | B2* | 3/2016 | Pick | F16C 19/38 |
| 9,915,246 | B2* | 3/2018 | Wendeberg | F16C 23/086 |
| 2004/0108733 | A1* | 6/2004 | Wobben | F03D 1/065 290/55 |
| 2011/0142658 | A1* | 6/2011 | Bonnet | F03D 1/0691 416/204 R |
| 2011/0150383 | A1* | 6/2011 | Yoshida | F16C 23/08 384/590 |
| 2015/0030277 | A1* | 1/2015 | Pick | F16C 19/38 384/558 |
| 2015/0267687 | A1* | 9/2015 | Wendeberg | F16C 23/086 415/170.1 |
| 2018/0266399 | A1* | 9/2018 | Wu | F03D 80/70 |

FOREIGN PATENT DOCUMENTS

CN 203868298 U 10/2014

* cited by examiner

*Primary Examiner* — Eldon T Brockman
*Assistant Examiner* — Danielle M. Christensen
(74) *Attorney, Agent, or Firm* — Dority & Manning, P.A.

(57) ABSTRACT

Wind turbines including a hub rotatably mounted on a frame are disclosed, wherein the hub includes a bearing arranged around the frame, a main hub body extending in an axial direction from a front end to a rear end, and including a central opening for fitting the main hub body around the bearing. A bearing adapter is attached to the bearing, and the bearing adapter is in contact with and fixed to an axially facing surface of the main hub body. Also methods for mounting are disclosed.

15 Claims, 5 Drawing Sheets

WIND TURBINE HUBS

BACKGROUND OF THE INVENTION

The present disclosure relates to wind turbine hubs. The present disclosure also relates to methods for assembling such hubs and wind turbines.

Modern wind turbines are commonly used to supply electricity into the electrical grid. Wind turbines of this kind generally comprise a rotor with a plurality of blades. The rotor with the blades is set into rotation under the influence of the wind acting on the blades. The rotation of the rotor drives the generator rotor either directly ("direct driven" wind turbine) or through the use of a gearbox.

The rotor of a wind turbine comprises a hub and a plurality of blades mounted on the hub. The wind turbine rotor may be operatively connected with a rotor shaft which forms the input shaft for the gearbox. Or, alternatively, a generator rotor is directly coupled with the wind turbine rotor (i.e. particularly with the hub or blades of the rotor).

In order to limit the transmission of bending loads to either a rotor shaft, gearbox or generator rotor, it is known to rotatably mount the hub on a frame. The hub rotates about the frame and at least partially surrounds the frame. A flexible or elastic coupling may be provided between the wind turbine rotor on the one hand and the rotor shaft or generator rotor on the other hand. The flexible or elastic coupling deforms under bending loads, and is configured to transmit mainly or substantially only torsional loads. The bending loads instead may in this manner be transmitted to the frame directly.

The hub could be mounted on the frame with various different bearing arrangements. In particular, it is known to use a front bearing and a rear bearing. Both these bearings may typically be rolling element bearings. For example, ball bearings and roller bearings and in particular tapered roller bearings can be used.

Manufacturers of wind turbines are confronted with a number of issues associated with the upscaling and the adaptability of wind turbines. As the dimensions of the turbines increase, the manufacturing and transportation costs increase significantly. In relation to the rotor hub, this problem is usually solved by manufacturing and transporting smaller parts or sectors of the hub which are then assembled together in-situ to form the actual hubs. E.g. a wind turbine rotor hub may be divided into three or four or five separate parts or sectors.

One problem may arise when a wind turbine is upgraded by increasing the rotor diameter. The corresponding increase in loads may require a change of bearings. When the bearings are changed, generally a hub needs to be re-designed as well to fit exactly with the new bearings. So an upgrading of the wind turbine can then not be done by only using larger blades as a redesign of the hub is also required.

Bearings of the required dimensions are moreover difficult and expensive to manufacture. Also their arrangement within the hub requires complicated machining of the radially facing cylindrical sections on which they are supported. In other words, the tolerances for the surfaces on which the bearings are arranged are often difficult to attain.

Consequently there is a need for wind turbine configurations which facilitate the manufacturing, assembly and maintenance of hubs for wind turbines. In examples of the present disclosure the problems of improving the flexibility and/or reducing the costs of these processes are at least partially resolved.

SUMMARY OF INVENTION

In a first aspect, a wind turbine comprising a hub rotatably mounted on a frame is disclosed. The hub comprises a bearing arranged around the frame, and a main hub body extending in an axial direction from a front end to a rear end, and including a central opening for fitting the main hub body around the bearing. A bearing adapter is attached to the bearing, and the bearing adapter is in contact with and fixed to an axially facing surface of the main hub body.

A bearing adapter in between the main body of the hub and the bearing makes it possible to use the same hub main body even if different bearings are used. The bearing adapter may be adjusted instead of the main hub body.

The axially facing surfaces are more easily accessible for the machining and the assembly of the bearings and the bearing adapters. An additional advantage for the machining of the axially facing surface is that, unlike the radially facing surfaces of the hub, the axially facing surfaces tend to be formed as mildly curved ring-shaped surfaces or, even as substantially flat surfaces. In the practice of some embodiments of the described systems and techniques is that the required tolerances are easier to achieve and the machining/manufacturing tools that might be used are more efficient, widely available and less costly.

In a further aspect, a method for assembling a wind turbine according to any the examples disclosed herein is provided. The method comprises attaching the one or more bearing adapters to the front and rear bearings and attaching the bearing adapter to the main hub body.

BRIEF DESCRIPTION OF THE DRAWINGS

Non-limiting examples of the present disclosure will be described in the following, with reference to the appended drawings, in which.

DETAILED DESCRIPTION

Figure 1:
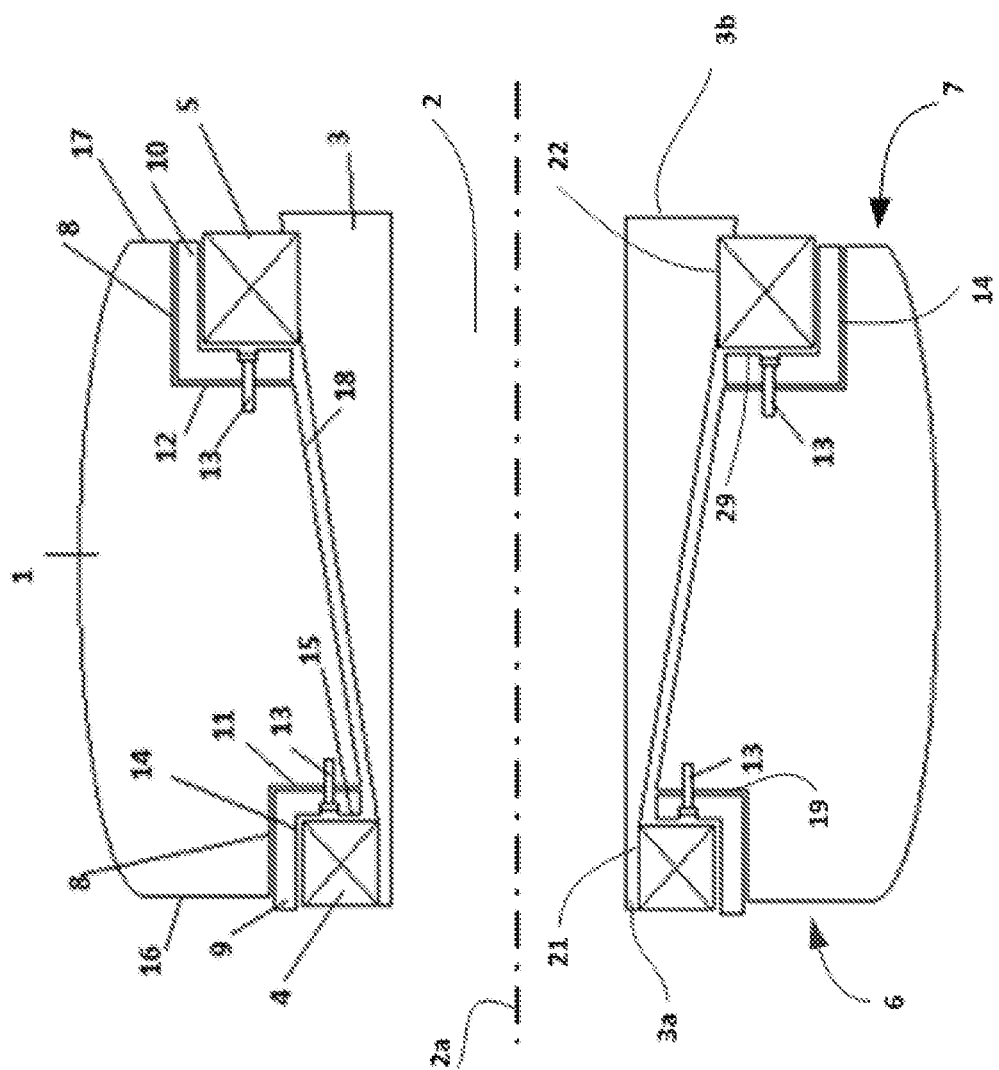
FIG. 1 shows an example of a wind turbine hub with a bearing adapter.

FIG. 1 shows a first example of a wind turbine hub. The hub in this example comprises a main body (1), with a central opening (2). In this example, the hub is rotatably mounted on a frame (3) via a front bearing (4) and a rear bearing (5). The front bearing and rear bearing may be of any type, in particular rolling element bearings may be used. An axis of rotation (2*a*) may be defined in the central opening (2).

The main hub body extends axially between a front end (6) and a rear end (7). It is to be understood that when referring to the arrangements of the bearings, the terms "front" and "rear" merely imply that the bearings are axially displaced from each other. In other words, the front bearing (4) is arranged in a front section and the rear bearing (5) is arranged in a rear section, which implies that the front bearing is closer to the front end of the main body than the rear bearing. Similarly, the frame (3) also extends from a front end (3a) to a rear end (3b).

While in some prior art configurations it is known to arrange the bearings directly onto the cylindrical surfaces (8) of the hub which in such a case functions as a bearing seat, the front and rear bearings in the example of FIG. 1 are fixed to the hub via respective bearing adapters (9, 10).

In the example of FIG. 1, the front bearing adapter (9) is attached to the front bearing and the rear bearing adapter (10) to the rear bearing (5). The front bearing adapter (9) is in contact with and fixed to an axially facing front surface (11) and the rear bearing adapter (10) is an axially facing rear surface (12) of the main hub body.

The arrangement of the bearing adapters in between the bearings and the main hub body makes it possible for bearings to be substituted with different bearings while keeping the same main hub body. Instead of having to design and manufacture a new main hub body (1) when using different bearings, only the smaller bearing adapters (9, 10) need to be changed.

Fixing the bearing adapters to axially facing surfaces has the effect that the portion of the hub that needs to be machined with very high tolerances is an axially facing flat surface. It is easier to machine such an axially facing flat surface with high tolerances than a radial surface, such as surfaces (8) of the main hub body.

Also such axially facing surfaces (11, 12) are easier to machine than the radially facing cylindrical surfaces (8) because they are more readily accessible and they are non-cylindrical, i.e. they may be formed as either substantially flat or mildly curved ring-shaped surfaces.

The term "axially facing surface" refers in particular to the front end surface (16) and rear end surface (17) of the main hub body (1) or to other surfaces (11) within the central opening of the hub which face substantially in the axial direction of the main hub body (1). The axial direction is defined as a direction along and parallel to the rotational axis (2a). Such axially facing surfaces (11, 16, 17) differ from the radially facing surfaces (8, 18) of the main body (1) in that the latter are normally inner curved cylindrical surfaces which are particularly difficult to access and to machine.

The bearing adapters may be fixed to of the main hub body (1) via fasteners (13) such as screws, or bolts or studs. Alternatively, the bearing adapters may be shrink-fit or press-fit to the main hub body (1).

Rolling element bearings such as bearings (9, 10) of FIG. 1 comprise an inner bearing ring, an outer bearing ring, and one or more rows of rolling elements in between the inner and outer bearing rings. The inner bearing ring may in some examples be shrink fitted onto the frame. The outer bearing ring may in some examples be press fitted with the bearing adapters.

The frame may incorporate a front bearing seat (21), and a rear bearing seat (22).

The bearing adapters (9, 10) in FIG. 1 have a generally L-shaped cross-section. The L-shaped cross-section provides a support surface (14) radially surrounding the bearing for supporting the bearings and a fitting surface (19) for fitting the bearings. The fitting surface (19) is axially arranged in between the bearing (22) and the main hub body (1).

The bearing adapters herein may be regarded as solids-of-revolution obtained by rotating a substantially L-shaped figure around the axis of rotation (2a). L-shaped cross-section should be understood in accordance herewith.

In FIG. 1, the front bearing adapter (9) and the rear bearing adapter (10) are separate elements. In other examples, only the front bearing or only the rear bearing is connected with a bearing adapter, and the other bearing is directly connected with the main hub body. In yet further examples, a single bearing adapter may be used that is attached to both the front bearing and the rear bearing.

While each of the bearing adapters is, in an embodiment, integrally formed as a single ring-shaped element, it is also possible to use one or several arch formed elements, each one extending over only part of the circumference of the central opening (2) of the main body (1).

Furthermore it should also be noted that while the reference to the "circumference of the main body" is intended to relate to the generally rotationally symmetric form (e.g. cylindrical, conical or frusto-conical) of the hub, it is clear that embodiments of the invention would also apply to other unconventional forms of the hub (e.g. prism or polyhedron).

One example of a method for assembling frame, bearings, bearing adapters and main hub body with each other may comprise positioning the frame in a substantially vertical position, such that the rear (typically wider) portion of the frame rests on a support. The bearings used may be e.g. tapered roller bearings.

In some implementations, the inner ring of the rear bearing may then be shrink fitted on the frame. To this effect, the inner ring of the rear bearing may be heated so that it expands, and then fitted around the frame. The inner ring contracts as it cools down and thus is fixed on the frame.

The outer bearing ring may in some examples be press fitted to the inner perimeter of the rear bearing adapter. Then the combination of the rear bearing adapter and outer ring can be assembled with the inner bearing ring.

The main hub body can then be inserted over the frame and rear bearing. The rear bearing may then be assembled with the main hub body through e.g. a bolted connection between the rear bearing adapter and the main hub body.

The outer ring of the front bearing may be fitted to the front bearing adapter. Then the front bearing adapter (with the outer ring of the front bearing) can be assembled with the main hub body. Again a bolted connection between main hub body and bearing adapter may be used. Then to complete the assembly, the inner ring of the front bearing may be shrink fitted to the outer bearing ring and the frame. To this effect, the inner bearing ring may be heated so that it expands, and then fitted around the frame. The inner ring contracts as it cools down and thus is fixed on the frame. This may be combined or substituted with press fitting into the final position to align the inner bearing ring with the outer bearing ring.

It should be clear that the order of some of these steps for assembly can be interchanged, or carried out at the same time. In the above described example however, the frusto-conical shape of the frame prescribes that the rear bearing and bearing adapter be mounted first before the main hub body and then the front bearing and front bearing adapter. With e.g. a cylindrical frame, this order might be different.

Also, in yet a further alternative example, e.g. in the case of a hub and generator being arranged downwind from the tower, the frustoconical shape of the frame may be the other way around, that is, the front end of the frame may be wider than the rear end of the frame. In that case, the frame may accordingly be positioned such that the front portion rests on a support.

Figure 2:
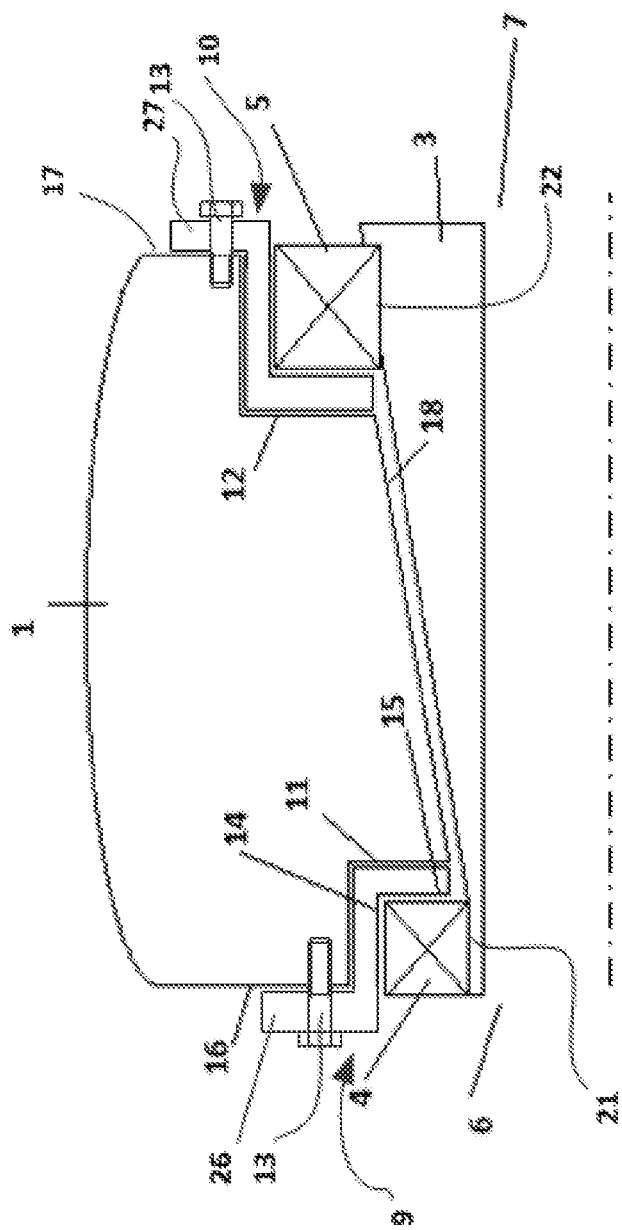
FIG. 2 shows another example of a wind turbine hub with a bearing adapter.

FIG. 2 shows an alternative example of a wind turbine hub with bearing adapters. Also in this example, both the front bearing (4) and the rear bearing (5) are connected to respectively a front bearing adapter (9) and a rear bearing adapter (10). The front and rear bearing adapters in this example have a substantially S-shaped cross-section, i.e. the bearing adapters may be regarded as solids of revolution resulting from rotating an S-shape around the axis of rotation. In comparison to the bearing adapters of the example of FIG. 1, the bearing adapters in this example include a further annular mounting flange.

The front bearing adapter (9) is axially fixed to the front surface (16) of the main hub body (1) and the rear bearing adapter (10) is axially faced to the rear surface (17) of the main hub body (1) using the annular mounting flanges (26, 27) of the bearing adapters.

Figure 3:
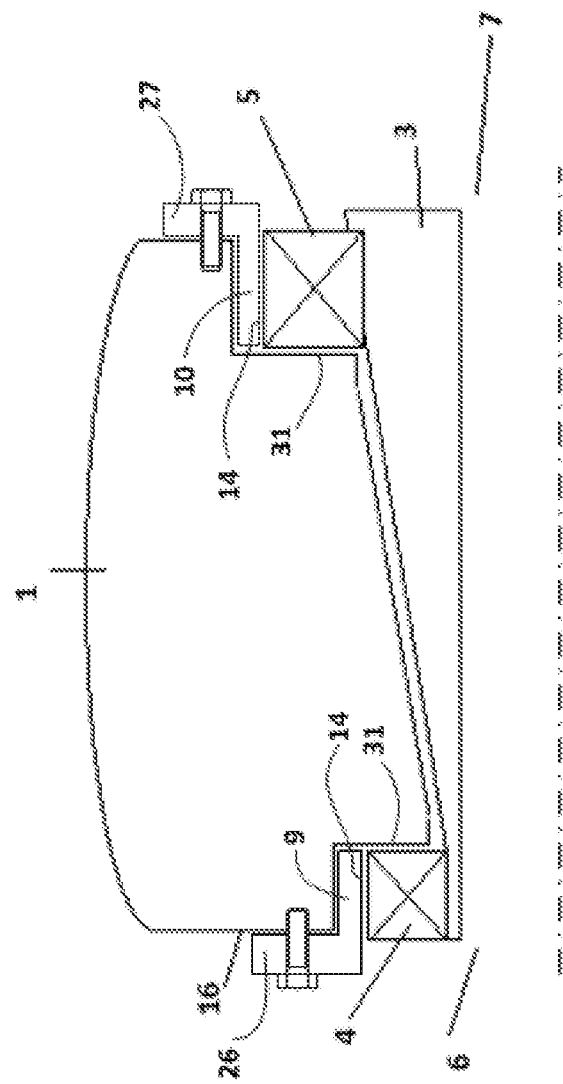
FIG. 3 shows a further example of a wind turbine hub with a bearing adapter.

FIG. 3 shows yet a further example wherein the bearing adapters (9, 10) have a substantially L-shaped cross-section. As in the example of FIG. 3, the bearing adapters include radial mounting flanges (26, 27). In this example, the bearing adapters include support surfaces for the bearings (9, 10), but the fitting surfaces (31) that determine the axial position of the bearings are not provided in the bearing adapters, but rather in the main hub body (1).

Figure 4:
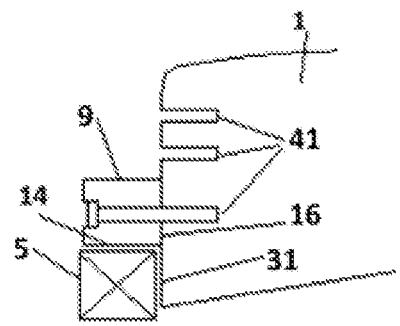
FIG. 4 shows a front portion of a further example of a wind turbine hub.

FIG. 4 shows an alternative example in which the first support surface (14) for a bearing (4, 5) is provided by an interior surface of a front bearing adapter (9) which may have a simplified square or rectangular cross-section.

A fitting surface (31) is in this case provided by a front surface (16) of the main hub body (1) directly extending from the same front surface (16) to which the front bearing adapter (9) is fixed.

FIG. 4 also shows several alternative attachment features or fastening holes (41) located on an end surface of the main body (1). Such features (41) may be used to fix the bearing adapter (9, 10) at different positions, so that the hub can be easily adapted to be used with bearings having different diameters. The features (41) may also be used to fix different bearing adapters (9, 10) to the hub.

While FIG. 4 shows only one of the ends of the hub, it is clear that the solutions shown may be implemented in either or in both of the front and rear bearings (4, 5).

Figure 5:
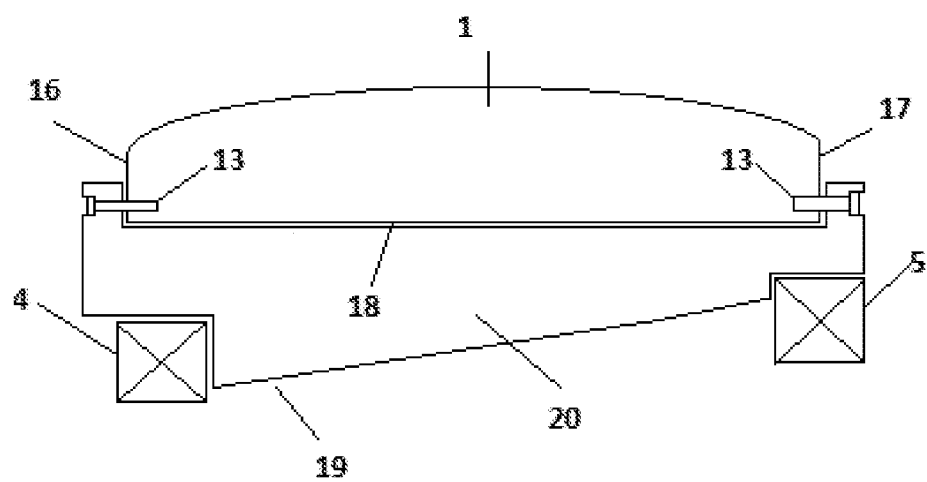
FIG. 5 shows a top portion of a further example of a wind turbine hub with a bearing adapter.

FIG. 5 shows another example including a single bearing adapter (19) attached to both the front bearing and the rear bearing. The intermediate part (20) connecting the front and rear parts of the bearing adapter (19) can be formed by a massive or hollow body or by ribs. Unlike in the embodiment of FIG. 1, where the bearing adapters are fixed to an axially facing surface (11) within the central opening of the main body (1), the example of FIG. 5 shows a bearing adapter which is fixed to the front (16) and rear (17) end surfaces of the main body (1).

Even though the bearing adapter of this example may still require precise machining to achieve the required tolerances, the bearing adapter at least makes it possible to change the bearing adapter in case of a change of bearings, rather than the main hub body.

It should be understood that the use of one or other axially facing surface can be exchanged between the different embodiments, and that all that is required for such adaptation is to select the appropriate form for the bearing adapter.

Furthermore, while the present disclosure is not particularly restricted to a range of dimensions, it is clear in view of the problems being faced, that the derived advantages may increase with the dimensions of the hub. Therefore, the examples disclosed herein are most suitable for hubs of relatively large dimensions, for example for bearings with an inner diameter larger than 500 mm (19.7 inches), in particular larger than 750 mm (29.5 inches), 1000 mm (39.4 inches) or 1500 mm (59.1 inches).

What has not been illustrated is that the configuration of the hub of any of these examples disclosed herein may be connected to a rotor shaft which is at least partially located within the frame. A coupling may be provided between a front surface (16) of the hub and a rotor shaft inside the frame. Rotation of the hub is thus transmitted to the rotor shaft, and from the rotor shaft to a gearbox and to a rotor of a generator. Alternatively, in any of these examples, a rotor (hub) may be directly coupled with the rotor of the generator. In such a case, a coupling may be provided between a rear surface of the hub and the generator rotor. These couplings may, in an embodiment, be elastic or flexible couplings in order to limit the transmission of bending loads.

In some examples, a single bearing may be arranged between the main hub body and the frame. In some cases, the single bearing may be arranged at or near a front end of the frame. And in some cases, the single bearing may be arranged at or near a rear end of the main hub body. Examples hereof are schematically illustrated in FIG. 6 and FIG. 7.

Figure 6:
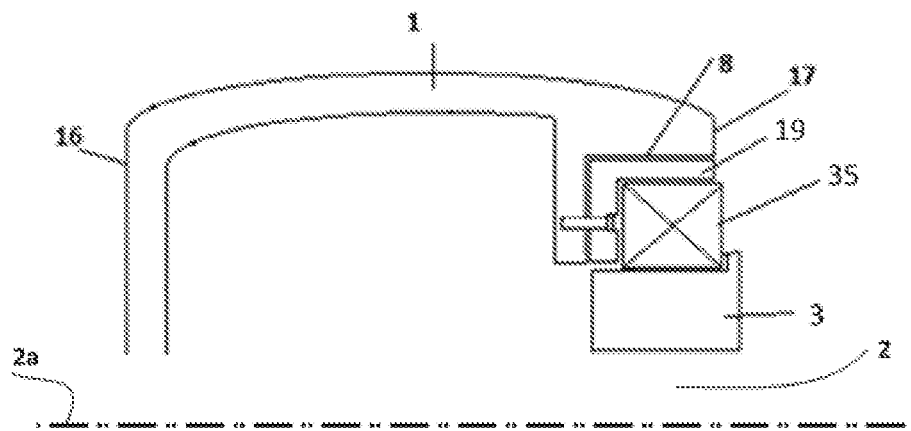
FIG. 6 shows a top half of a further example of a wind turbine hub with a bearing adapter.

In the example of FIG. 6, a main hub body (1) extends from a front end (16) to a rear end (17). The main hub body in this example is rotatably mounted on frame (3) through a single bearing (35). The bearing in this case may be for example a double tapered roller bearing, although other bearings are possible. The hub is configured to rotate about rotational axis 2a.

In this example, a bearing adapter (19) is arranged between bearing (5b) and main hub body (1). The bearing adapter is fixed to an axially and rearwardly facing surface of the main hub body (1). The bearing adapter in this case may have an L-shaped cross-section, similar to what was shown in FIG. 1.

Figure 7:
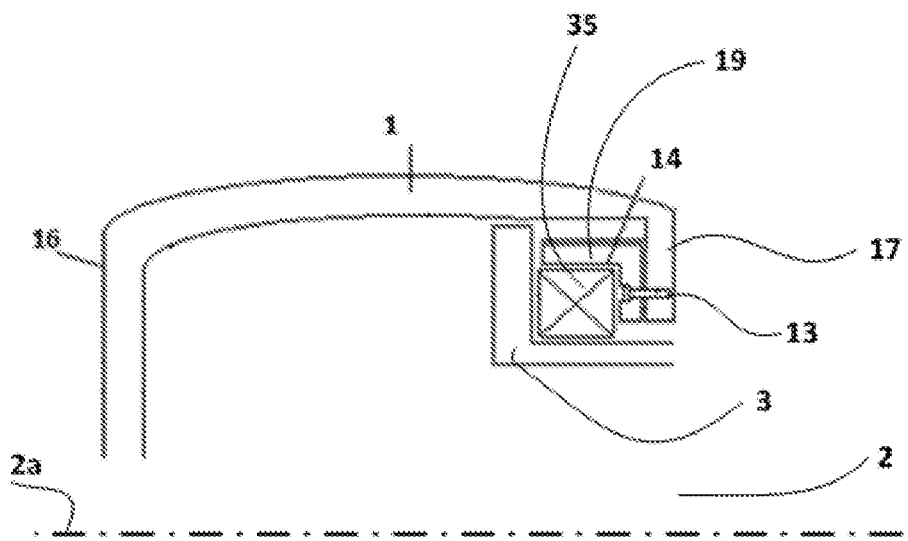
FIG. 7 shows a top half of yet a further example of a wind turbine hub with a bearing adapter.

FIG. 7 schematically illustrates a further example. As in FIG. 6, a single bearing (35) may be arranged around frame (3) for rotatably mounting the hub (1) on the frame (3). Many aspects of this example are the same or similar to those of the example of FIG. 6. However, in this example, the bearing adapter (19) may be fixed to an axial surface of the hub, which is forward facing. The bearing adapter may again have a substantially L-shaped cross-section, but the orientation of the "L" is different than in the previous example.

Not shown in any of these examples is that the frame may be mounted in the nacelle. The frame (3) may be (and particularly in the examples comprising both a front and a rear bearing) divided into several part frames, e.g. a front frame carrying the hub and a rear frame mounted in the nacelle, or e.g. a front frame carrying the hub, a middle frame carrying a generator, and a rear frame mounted in the nacelle.

In most examples shown, the frame has a substantially frusto-conical shape, but it should be clear that other shapes could also be used, e.g. cylindrical frames.

And even though a detailed method of assembly was only described with reference to the example of FIG. 1, it should be clear that same or similar methods of assembly can also be used with the examples of the other figures.

This written description has used examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application.

What is claimed is:

1. A wind turbine, comprising:
   a frame;
   a hub rotatably mounted on the frame, the hub comprising a main hub body positioned in an axial direction from a front end to a rear end, the main hub body comprising a central opening extending from the front end to the rear end of the hub, the main hub body substantially surrounding the frame;
   a front bearing and a rear bearing arranged around the frame, the central opening of the main hub body fitted around the front bearing and the rear bearing with the front bearing arranged axially closer to the front end of the main hub body than the rear bearing; and
   a bearing adapter attached to the front bearing or the rear bearing and secured to the main hub body via one or more fasteners, at least a portion of the bearing adapter being sandwiched between an axially-facing side of the front bearing or the rear bearing and an axially-facing surface of the main hub body of the hub, wherein the portion of the hearing adapter that is sandwiched between the axially-facing side of the front bearing or the rear bearing and the axially-facing surface of the main hub body of the hub is in direct contact with and fixed to the axially-facing surface of the main hub body and also in direct contact with the front bearing or the rear bearing.

2. The wind turbine of claim 1, wherein the bearing adapter is attached to both the front bearing and the rear bearing and the main hub body.

3. The wind turbine of claim 1, wherein the bearing adaptor comprises a front bearing adaptor and a rear bearing adaptor, the front bearing adapter is attached to the front bearing and the main hub body, and the rear bearing adapter is attached to the rear bearing and the main hub body.

4. The wind turbine of claim 1, wherein the bearing adapter comprises a support surface radially surrounding the front bearing or the rear bearing.

5. The wind turbine of claim 4, wherein the bearing adapter comprises a fitting surface axially arranged in between the front bearing or the rear bearing and the main hub body.

6. The wind turbine of claim 1, wherein the bearing adapter comprises a fitting surface axially arranged in between the front bearing or the rear bearing and the main hub body.

7. The wind turbine of claim 1, wherein the bearing adapter comprises an annular mounting flange.

8. The wind turbine of claim 1, wherein the main hub body comprises an assembly of three to six hub sectors.

9. A method for assembling a wind turbine having a hub rotatably mounted on a frame, the hub having a front bearing and a rear bearing arranged around the frame and a main hub body extending in an axial direction from a front end to a rear end, the main hub body having a central opening extending from the front end to the rear end of the hub, the main hub body substantially surrounding the frame, the central opening for fitting the main hub body around the front bearing and the rear bearing, the front bearing arranged axially closer to the front end of the main hub body than the rear bearing, the method comprising:
   attaching a separate bearing adapter to the front bearing or the rear bearing and securing the bearing adaptor to the main hub body via one or more fasteners between the front bearing or the rear bearing and the hub with at least a portion of the bearing adapter being sandwiched between an axially-facing side of the front bearing or the rear hearing and an axially-facing surface of the main hub body of the hub; and
   attaching the portion of the bearing adapter that is sandwiched between the axially-facing side of the front bearing or the rear beating and the axially-facing surface of the main hub body of the huh to the axially-facing surface of the main hub body such that the hearing adapter is in direct contact with axially-facing surface of the main hub body and also in direct contact with the front bearing or the rear bearing.

10. The method of claim 9, wherein attaching the bearing adapter to the front bearing or the rear hearing comprises press-fitting.

11. The method of claim 10, wherein attaching the bearing adapter to the front bearing or the rear bearing comprises press-fitting of an outer ring of the front bearing or the rear bearing to the bearing adapters.

12. The method of claim 9, wherein attaching the front bearing or the rear bearing adapter to the axially facing surface of the main hub body includes fastening with screws or bolts.

13. The method of claim 9, wherein the bearing adapter is attached to the main hub body before attaching the bearing adapter to the front bearing or the rear bearing.

14. The method of claim 9, wherein the bearing adapter is attached to the main hub body after attaching the bearing adapter to the front bearing or the rear bead rig.

15. The method of claim 9, wherein mounting the assembly of the bearing adapter, bearing and main hub body comprises shrink fitting.

\* \* \* \* \*